US012653141B2

(12) United States Patent
Song

(10) Patent No.: US 12,653,141 B2
(45) Date of Patent: Jun. 16, 2026

(54) SELF-CLEANING CAT LITTER BOX

(71) Applicant: DONGGUAN CACTUS SCIENCE & TECHNOLOGY CO., LIMITED, Dongguan (CN)

(72) Inventor: Zhihui Song, Shenzhen (CN)

(73) Assignee: DONGGUAN CACTUS SCIENCE & TECHNOLOGY CO., LIMITED, Dongguan (CN)

( * ) Notice: Subject to any disclaimer, the term of this patent is extended or adjusted under 35 U.S.C. 154(b) by 0 days.

(21) Appl. No.: 18/969,339

(22) Filed: Dec. 5, 2024

(65) Prior Publication Data

US 2026/0101864 A1 Apr. 16, 2026

(30) Foreign Application Priority Data

Oct. 10, 2024 (CN) .......................... 202411412993.3
Oct. 10, 2024 (CN) .......................... 202422450679.6
Oct. 10, 2024 (CN) .......................... 202422450693.6

(51) Int. Cl.
*A01K 1/01* (2006.01)

(52) U.S. Cl.
CPC .................................. *A01K 1/0107* (2013.01)

(58) Field of Classification Search
CPC ..... A01K 1/0107; A01K 1/011; A01K 1/0114
See application file for complete search history.

(56) References Cited

U.S. PATENT DOCUMENTS 11,944,066 B2 * 4/2024 Ma ............................ B07B 1/28
11,963,512 B1 * 4/2024 Tang ................... A01K 1/0114
12,075,750 B2 * 9/2024 Zhou .................... A01K 1/0114

(Continued)

FOREIGN PATENT DOCUMENTS

CN 209990852 U 1/2020
CN 111837972 A * 10/2020 ............. A01K 1/011

(Continued)

OTHER PUBLICATIONS

MeoWant Self-Cleaning Cat Litter Box, 75L Extra Large Open Automatic Cat Litter Box for Multi Cats, Integrated Safety Protection/ APP Control/Odor Removal Smart Litter Box with Mat & Liner, Apr. 15, 2024, 10 pages, Retrieved from the Internet <URL: https://www.amazon.com/MeoWant-Self-Cleaning-Automatic-Integrated-Protection/dp/B0D1QWZDKT/ref=zg_bs_g_17602464011_ d_sccl_9/141-1239452-8355432?th=1>.

*Primary Examiner* — Joshua D Huson
*Assistant Examiner* — Alanna K Peterson
(74) *Attorney, Agent, or Firm* — AVEK IP, LLC

(57) ABSTRACT

A self-cleaning cat litter box includes a base, a drum, at least one driven toothed structure, at least one driving toothed structure, and a driving device. The at least one driven toothed structure is arranged on an outer peripheral wall of the drum, extending along a circumferential direction of the drum, and approximately symmetrically arranged with respect to the central plane. The at least one driving toothed structure is mounted on the base, approximately symmetrically arranged with respect to the central plane. When the drum is disposed on the base, each of the at least one driven toothed structure engages with a respective one of the at least one driving toothed structure, and the driving device is capable of driving the at least one driving toothed structure and driving the drum to rotate about the rotation axis.

13 Claims, 17 Drawing Sheets

(56)                    References Cited

U.S. PATENT DOCUMENTS

| | | | |
|---|---|---|---|
| 12,171,188 B2 * | 12/2024 | Tian .................... | A01K 1/0114 |
| 2002/0139312 A1 * | 10/2002 | Reitz ................... | A01K 1/0114 |
| | | | 119/165 |
| 2013/0333625 A1 * | 12/2013 | Baxter .................. | A01K 1/011 |
| | | | 119/166 |
| 2020/0060221 A1 * | 2/2020 | Fan ..................... | A01K 1/0114 |
| 2021/0267158 A1 * | 9/2021 | Ma ........................ | A01K 1/011 |
| 2024/0114874 A1 * | 4/2024 | Zhang ................. | A01K 1/0114 |

FOREIGN PATENT DOCUMENTS

| | | | |
|---|---|---|---|
| CN | 118235712 A | * | 6/2024 |
| WO | WO-2023108945 A1 | * | 6/2023 |

* cited by examiner

20

63

61d/602d

62d/601d

20

61e/601e

12102/15/602e

SELF-CLEANING CAT LITTER BOX

CROSS-REFERENCE TO RELATED APPLICATIONS

The present application claims: the priority of the Chinese patent application No. 202422450679.6, filed on Oct. 10, 2024; the priority of the Chinese patent application No. 202411412993.3, filed on Oct. 10, 2024; and the priority of the Chinese patent application No. 202422450693.6, filed on Oct. 10, 2024. Contents of which are incorporated herein by their entireties.

FIELD

The present disclosure relates to the field of cat litter boxes, and particularly to a self-cleaning cat litter box.

BACKGROUND

Drum-type cat litter boxes usually depend on rotation of drums to filter cat litter and clean feces. Generally, the drum-type cat litter box includes a drum and a base. A gear driving structure is arranged on the base, and a gear driven structure is arranged on an outside of the drum. In this way, the drum can be driven to rotate on the base.

However, in the existing cat litter box of this type, the gear driven structure is arranged on one side of the drum, leading to a problem of unbalanced force when the drum rotates, causing the drum to skew. Thus, a matching locking structure is needed to stabilize the drum and lock the drum on the base, only allowing the drum to rotate. However, the locking structure introduces problems of troublesome installation and inconvenient disassembly of the drum.

SUMMARY

The present disclosure provides a self-cleaning cat litter box. The self-cleaning cat litter box includes a base, a drum, at least one driven toothed structure, at least one driving toothed structure, and a driving device. The drum is approximately symmetrically arranged with respect to a central plane perpendicular to a rotation axis of the drum. The at least one driven toothed structure is arranged on an outer peripheral wall of the drum, extending along a circumferential direction of the drum, and approximately symmetrically arranged with respect to the central plane. The at least one driving toothed structure is mounted on the base, approximately symmetrically arranged with respect to the central plane. Each of the at least one driving toothed structure is configured to engage with a respective one of the at least one driven toothed structure. The driving device is configured to drive the at least one driving toothed structure to rotate. When the drum is disposed on the base, each of the at least one the driven toothed structure engages with a respective one of the at least one driving toothed structure, and the driving device is capable of driving the at least one driving toothed structure and driving the drum to rotate about the rotation axis.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
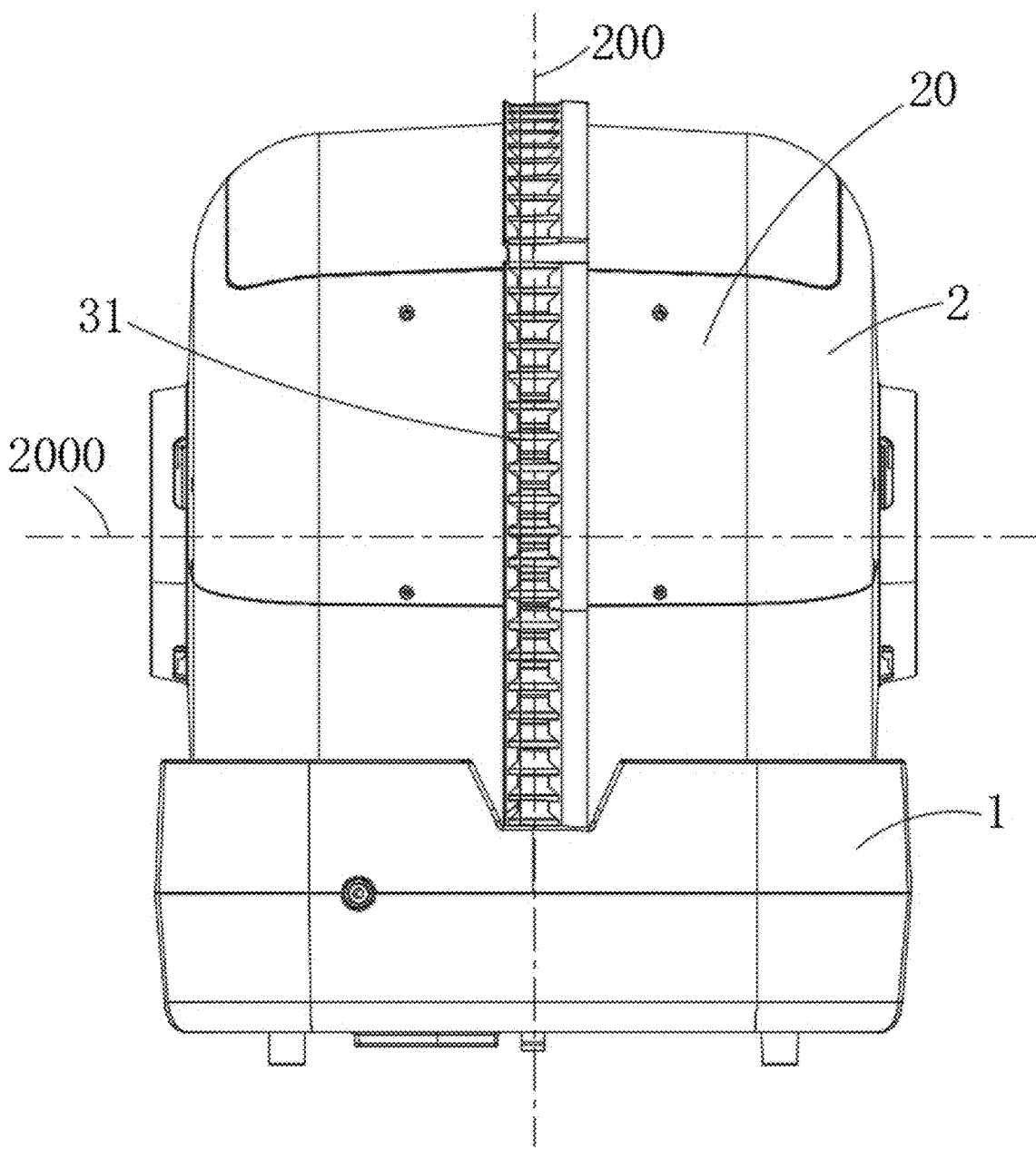
FIG. 1 is a first schematic view of an overall structure of a self-cleaning cat litter box according to an embodiment of the present disclosure.

Base 1, bottom shell 11, supporting mechanism 12, inner cavity 13, limiting gap 14, guiding wheel 15, avoidance groove 16, bottom wall 161 corresponding to the avoidance groove 16, front wall 17, rear wall 18, avoidance gap 19, rotation groove 111, mounting groove 112, limiting reinforcing rib 113, roller assembly 121, inner wall 131, roller structure 1210, connection seat 12101, abutting wheel 12102, first roller assembly 1211, second roller assembly 1212, auxiliary roller assembly 1213;

Drum 2, outer peripheral wall 20, rotation axis 2000, limiting baffle 22, central plane 200, first baffle 221, second baffle 222, foolproof flange 223, first contact point 201, second contact point 202, lowest point 203, first connection line 204, second connection line 205, reference line 206, center of gravity 207 of the drum 2, working cavity 208, entry face 209, entrance 2091;

Driven toothed structure 3, driven gear 31, teeth 300 of the driven toothed structure 3;

Driving device 4, output end 41;

Driving toothed structure 5, driving gear 51, teeth 500 of the driving toothed structure;

Guiding structure 6, first guiding part 61*a*, 61*b*, 61*c*, 61*d*, 61*e*, second guiding part 62*a*, 62*b*, 62*c*, 62*d*, 62*e*, guiding ramp 63, guiding groove 601*a*, 601*b*, 601*c*, 601*d*, 601*e*, guiding boss 602*b*, 602*c*, 602*d*.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

As illustrated in FIGS. 1-17, a self-cleaning cat litter box is provided in the present disclosure. The self-cleaning cat litter box includes a base 1, a drum 2, at least one driven toothed structure 3, a driving device 4, and at least one driving toothed structure 5.

Figure 6:
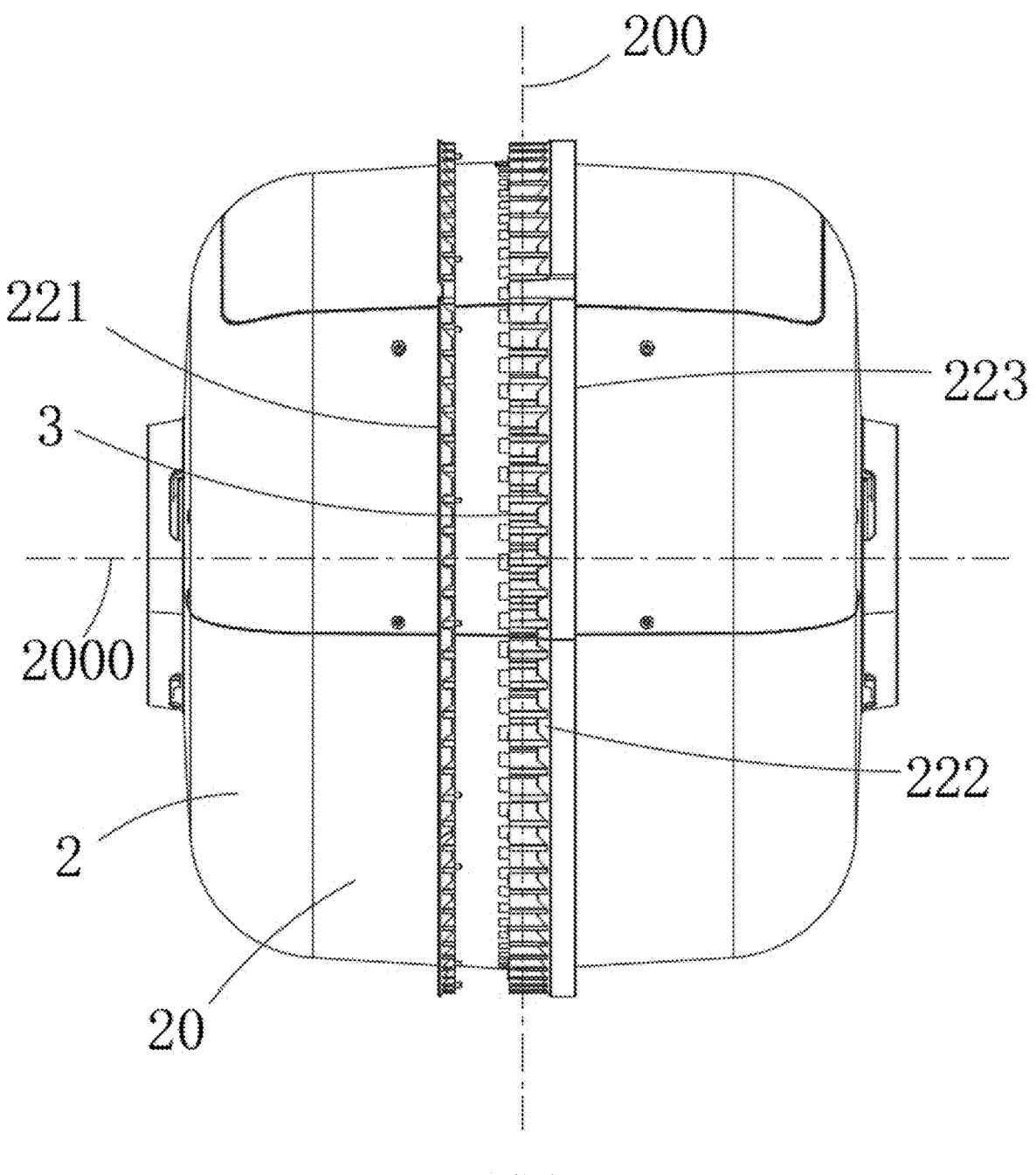
FIG. 6 is a structural view of the drum according to an embodiment of the present disclosure, illustrating a detachable state of a first baffle.
Figure 11:
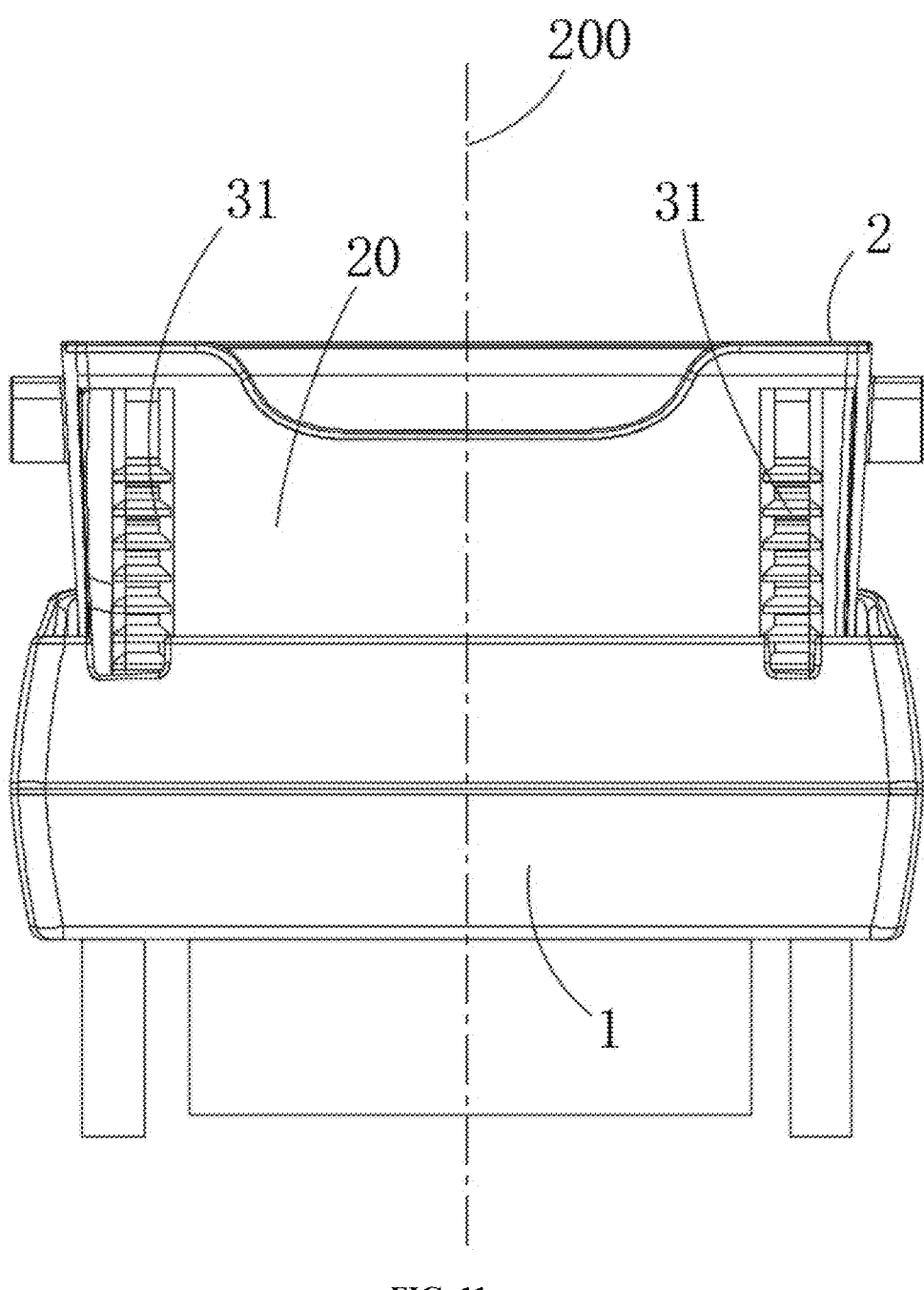
FIG. 11 is a schematic view of the overall structure of the self-cleaning cat litter box according to another embodiment of the present disclosure, illustrating two driven gears.

Taking a plane perpendicular to a rotation axis 2000 of the drum 2 as a central plane 200 as shown in FIGS. 1, 6, and 11, the drum 2 is approximately symmetrically arranged with respect to the central plane 200.

The at least one driven toothed structure 3 is arranged on an outer peripheral wall 20 of the drum 2 and extending along a circumferential direction of the drum 2. Furthermore, the at least one driven toothed structure 3 is approximately symmetrically arranged with respect to the central plane 200. Each of the at least one driven structure 3 may be a driven gear. The number of the at least one driven toothed structure 3 may be one, as shown in FIG. 1, or may be two, as shown in FIG. 11. Alternatively, the number of the at least one driven toothed structure 3 may be three, four, or more.

The driving device 4 is mounted on the base 1. The driving device 4 has an output end 41. In an embodiment, the driving device 4 is a motor, and the output end 41 is an output shaft of the motor.

Figure 4:
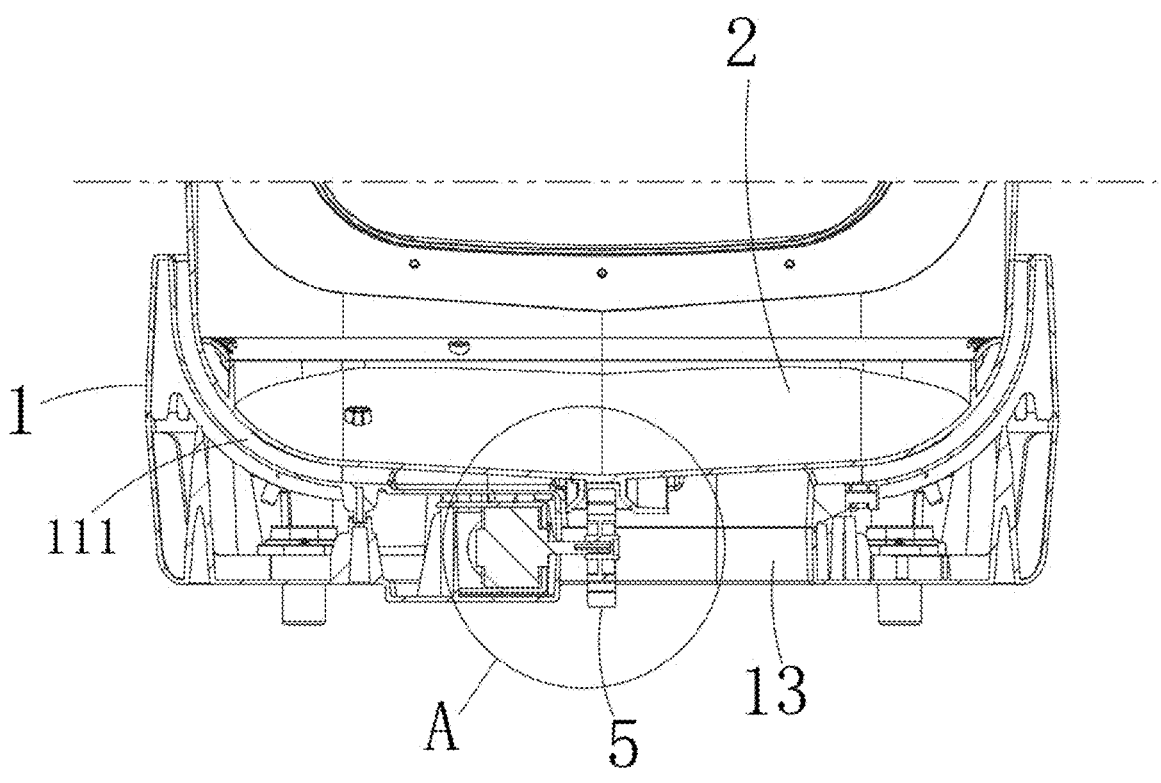
FIG. 4 is a sectional view of a partial structure of the self-cleaning cat litter box according to an embodiment of the present disclosure.
Figure 5:
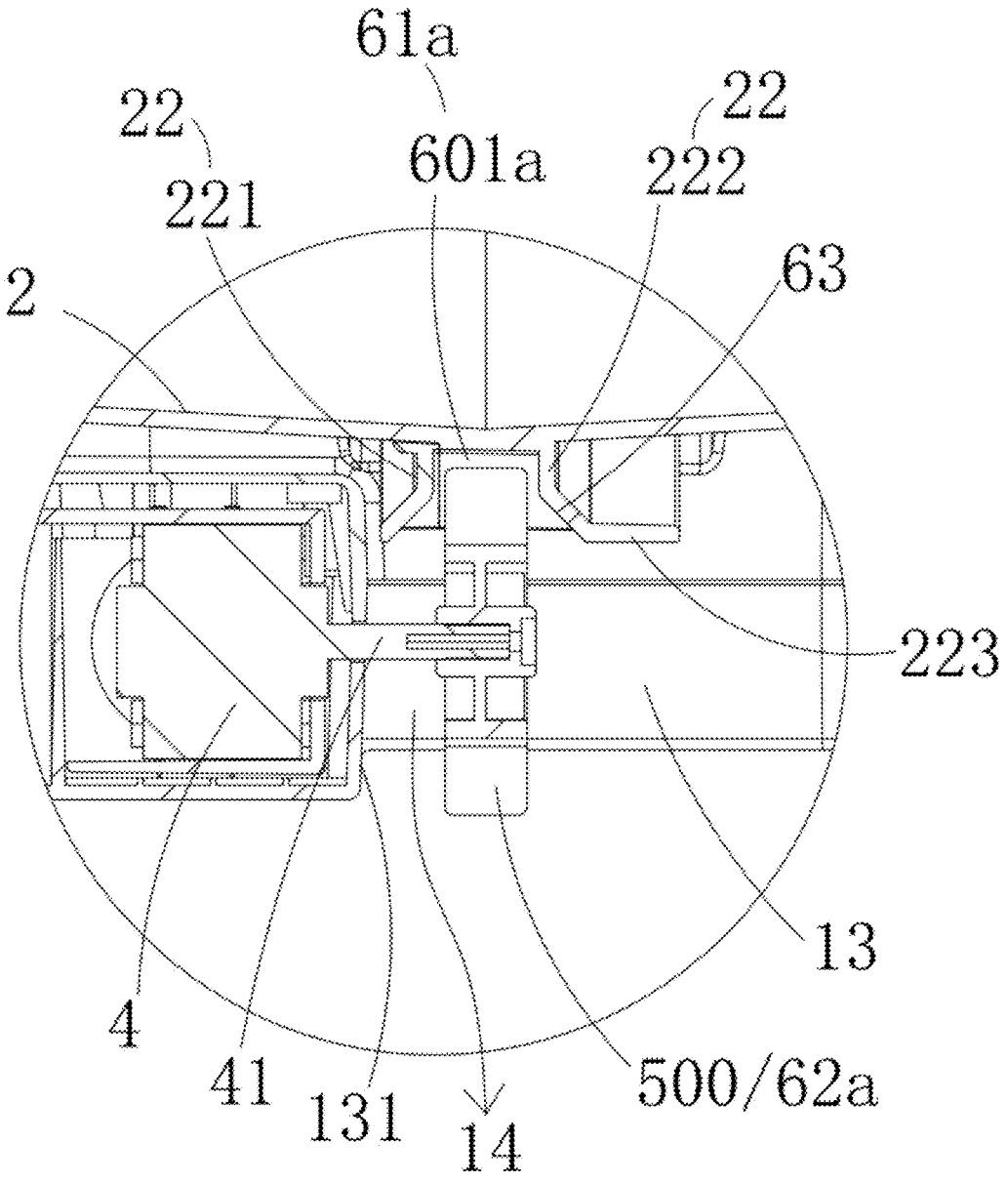
FIG. 5 is an enlarged view of a portion A in FIG. 4.

As shown in FIGS. 4 and 5, the driving toothed structure 5 is mounted at the output end 41, and is also approximately symmetrically arranged with respect to the central plane 200. The driving toothed structure 5 is configured to engage with the driven toothed structure 3. The driving toothed structure 5 and the driven toothed structure 3 cooperatively form a driving structure for the drum 2.

When the drum 2 is correctly placed on the base 1, each of the at least one driven toothed structure 3 engages with a respective one of the at least one driving toothed structure 5. In this way, the drum 2 can be driven by the driving device 4 to rotate about the rotation axis 2000 of the drum 2, and sand-filtering and feces-cleaning can be implemented.

Specifically, for the self-cleaning cat litter box in this embodiment, the at least one driven toothed structure 3 is approximately symmetrically arranged with respect to the central plane 200, and the at least one driving toothed structure 5 is also approximately symmetrically arranged with respect to the central plane 200. Thus, when the drum 2 is driven to rotate, an overall of the drum 2 is force-balanced. In this way, an extra locking structure is not needed to fix a position of the drum 2, thus the drum 2 can be directly lifted from the base 1 without unlocking; or once the drum 2 is correctly placed on the base 1, the each of the at least one driven toothed structure 3 and the respective one of the at least one driving toothed structure 5 are engaged with each other, and the self-cleaning cat litter box can be normally used directly. Therefore, the self-cleaning cat litter box in the present embodiment is convenient in disassembly and cleaning and can maintain balance of the drum 2.

Furthermore, in order to reduce friction between the drum 2 and the base 1, the base 1 includes a bottom shell 11 and a supporting mechanism 12. The supporting mechanism 12 is mounted on the bottom shell 11, and the supporting mechanism 12 is configured to support the drum 2. Specifically, the supporting mechanism 12 includes a plurality of roller assemblies 121. Each of the plurality of roller assemblies 121 is mounted on the bottom shell 11. When the drum 2 is correctly disposed on the base 1, each of the plurality of roller assemblies 121 is located below the drum 2, the plurality of roller assemblies 121 are arranged along a circumferential direction of the drum 2, and each of the plurality of roller assemblies 121 abuts against the outer peripheral wall 20 of the drum 2. For the self-cleaning cat litter box in this embodiment, the drum 2 is supported cooperatively by the plurality of roller assemblies 121. In this way, firstly, a contact area between the drum 2 and the bottom shell 11 is reduced, thus it is more convenient for controlling a rotation of the drum 2. Additionally, a connection between the drum 2 and each roller assembly 121 is a rolling connection, which can reduce a kinetic energy loss of the drum 2. Specifically, each roller assembly 121 includes a plurality of abutting wheels 12102, and the number of the abutting wheels 12102 is an even number. The abutting wheels 12102 are configured to contact the outer peripheral wall 20 of the drum 2. The plurality of abutting wheels 12102 of each roller assembly 121 are also approximately symmetrically arranged with respect to the central plane 200, mainly to ensure the force balance of the drum 2.

Regarding the at least one driven toothed structure 3 and the at least one driving toothed structure 5, in an embodiment, as shown in FIG. 1, the number of the at least one driven toothed structure 3 is only one, and the each of the at least one driven toothed structure 3 is a driven gear 31. This driven gear 31 is arranged in a middle of the outer peripheral wall 20 of the drum 2. In other words, the driven gear 31 passes through the central plane 200. Correspondingly, the number of the at least one driving toothed structure 5 is only one, and the each of the at least one driving toothed structure 5 is a driving gear 51. The driving gear 51 is arranged right below the drum 2. The driving gear 51 engages with the driven gear 31.

Regarding the at least one driven toothed structure 3 and the at least one driving toothed structure 5, in another embodiment, as shown in FIG. 11, the number of the at least one driven toothed structure 3 is two, and the each of the at least one driven toothed structure 3 is a driven gear 31. Each of the two driven gears 31 is arranged on the outer peripheral wall 20 of the drum 2, and the two driven gears 31 are approximately symmetrically arranged with respect to the central plane 200. Correspondingly, the number of the at least one driving toothed structure 5 is two, and each of the at least one driving toothed structure 5 is a driving gear 51. Each of the two driving gears 51 is configured to engage with a respective one of the two driven gears 31. Considering that some self-cleaning cat litter boxes may have sand falling right below the drum 2, neither the two driven gears 31 nor the two driving gears 51 is arranged right below the drum 2, and a problem of unbalanced force of the drum 2 caused thereby can be avoided by two driving structures approximately symmetrically arranged in the present embodiment.

Similarly, in other embodiments, the number of the at least one driven toothed structure 3 may be three, four, or even more 31. Correspondingly, the number of the at least one driving toothed structure 5 may be three, four, or even more.

Further, in order to allow user to conveniently use the self-cleaning cat litter box, the self-cleaning cat litter box further includes a guiding structure 6. On one aspect, the guiding structure 6 is configured to guide an engagement between the at least one driven toothed structure 3 and the at least one driving toothed structure 5. On another aspect, the guiding structure 6 is configured to constrain a deviation of the drum 2 along the rotation axis 2000 of the drum 2. By means of the guiding structure 6, the user can randomly place the drum 2 on the base 1, and then the each of the at least one driven toothed structure 6 and the respective one of the at least one driving toothed structure 8 can automatically align and engage with each other under a guide of the guiding structure 6 without a deliberate alignment by the user. In addition, it can also prevent the axial deviation of the drum 2 during a movement of each of the at least one driving toothed structure 5 engaging with a respective one of the at least one driven toothed structure 3.

Furthermore, the guiding structure 6 extends along a circumferential direction of the drum 2. The guiding structure 6 includes a first guiding part 61*a*, 61*b*, 61*c*, 61*d*, or 61*e* and a second guiding part 61*a*, 61*b*, 61*c*, 61*d*, or 61*e*. The first guiding part is arranged on the outer peripheral wall 20 of the drum 2, and the second guiding part is arranged on the base 1. When the drum 2 is correctly disposed on the base 1, the first guiding part is in a mating connection with the second guiding part to constrain the movement of the drum 2 along the rotation axis 2000 of the drum 2.

At least one of the first guiding part and the second guiding part is arranged with a guiding ramp 63. The guiding ramp 63 is configured to guide the mating connection of the first guiding part and the second guiding part so as to engage the each of the at least one driven toothed structure 3 with the respective one of the at least one driving toothed structure 5.

Regarding existence forms, the first guiding part and the second guiding part can be in a form of a boss and a groove matched with each other. For example, one of the first guiding part and the second guiding part is configured as a guiding groove, and the other of the first guiding part and the second guiding part is configured as a guiding boss. At least one of the guiding groove and the guiding boss is arranged with a guiding ramp 63. The guiding ramp 63 is configured to guide the guiding boss to insert into the guiding groove and constrain the movement of the drum 2 along the rotation axis 2000, thereby guiding the engagement between the each of the at least one driven toothed structure 3 and the respective one of the at least one driving toothed structure 5.

In order to implement a guide function of the guiding ramp 63 more completely, in an embodiment, the number of the guiding ramp 3 is two. Two guiding ramps 63 are approximately symmetrically arranged on both sides of the guiding groove, with one guiding ramp 63 arranged on one side of the guiding groove and the other guiding ramp 63 arranged on the other side of the guiding groove. Of course, in other embodiments, the two guiding ramps 63 can also be respectively arranged on both sides of the guiding boss, with one guiding ramp 63 arranged on one side of the guiding boss and the other guiding ramp 63 arranged on the other side of the guiding boss.

Figure 12:
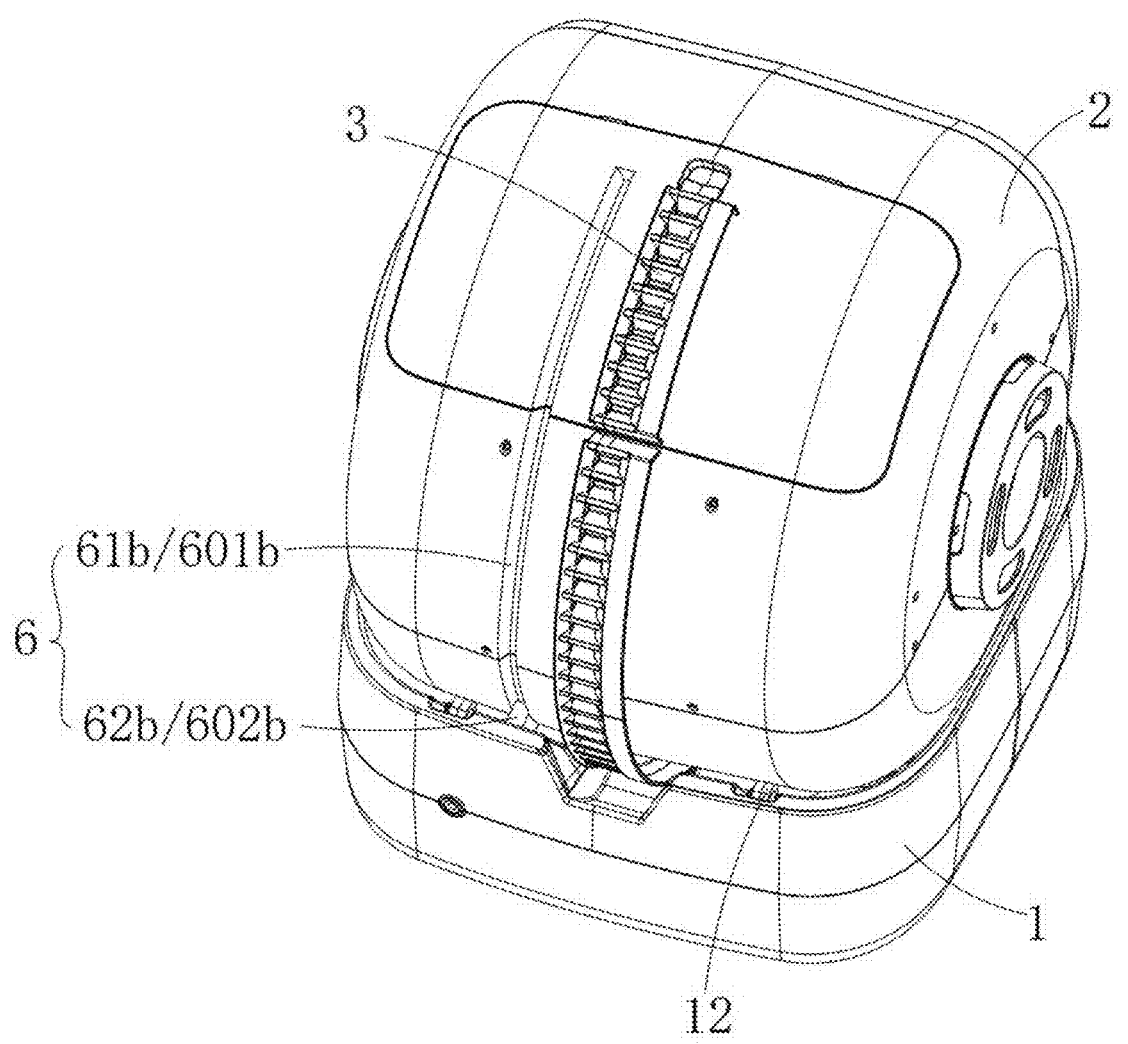
FIG. 12 is a schematic view of the overall structure of the self-cleaning cat litter box according to a further embodiment of the present disclosure, illustrating an available arrangement of a guiding structure.

Regarding the guiding structure 6, in an embodiment, as shown in FIG. 12, the first guiding part 61*b* is a guiding groove 601*b* extending along the circumferential direction of the drum 2, the second guiding part 62*b* is a guiding boss 602*b* arranged on the base 1, and the guiding boss 602*b* is inserted into the guiding groove 601*b*. In addition, when the drum 2 has an axial deviation, the guiding boss 602*b* can abut against an inner side wall corresponding to the guiding groove 601*a*, thereby preventing the drum 2 from a further deviation.

Figure 13:
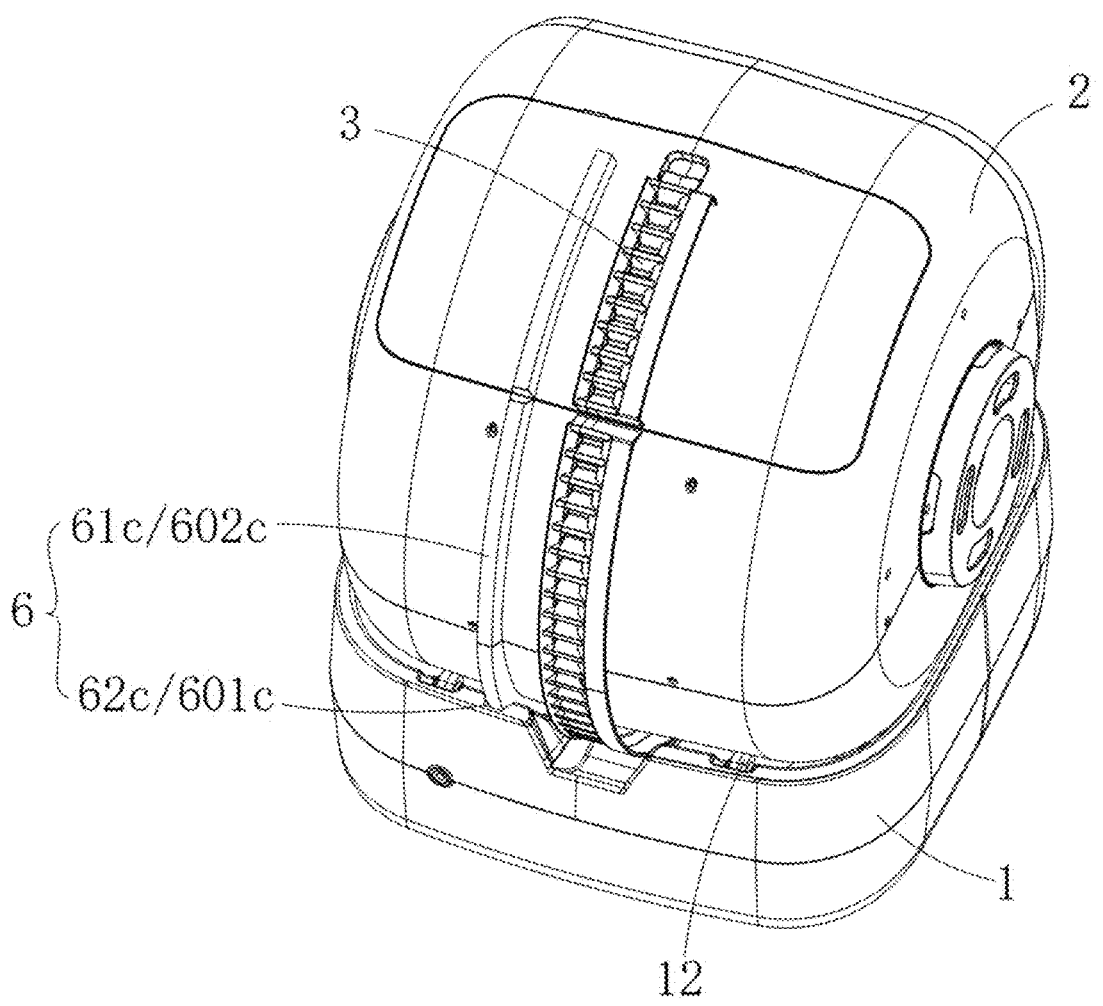
FIG. 13 is a schematic view of the overall structure of the self-cleaning cat litter box according to a still further embodiment parallel to the embodiment shown in FIG. 12 of the present disclosure, illustrating another available arrangement of the guiding structure.

In another embodiment, with reference to FIG. 13, the first guiding part 61*c* is a guiding boss 602*c* arranged on the outer peripheral wall 20 of the drum 2, and the second guiding part 62*c* is a guiding groove 601*c* defined in the base 1. The guiding groove 601*c* extends along the circumferential direction of the drum 2. The guiding boss 602*c* is inserted into the guiding groove 601*c*. In addition, when the drum 2 has an axial deviation, the guiding boss 602*c* can also abut against the inner side wall corresponding to the guiding groove 601*c*, thereby preventing the drum 2 from a further deviation.

Figure 14:
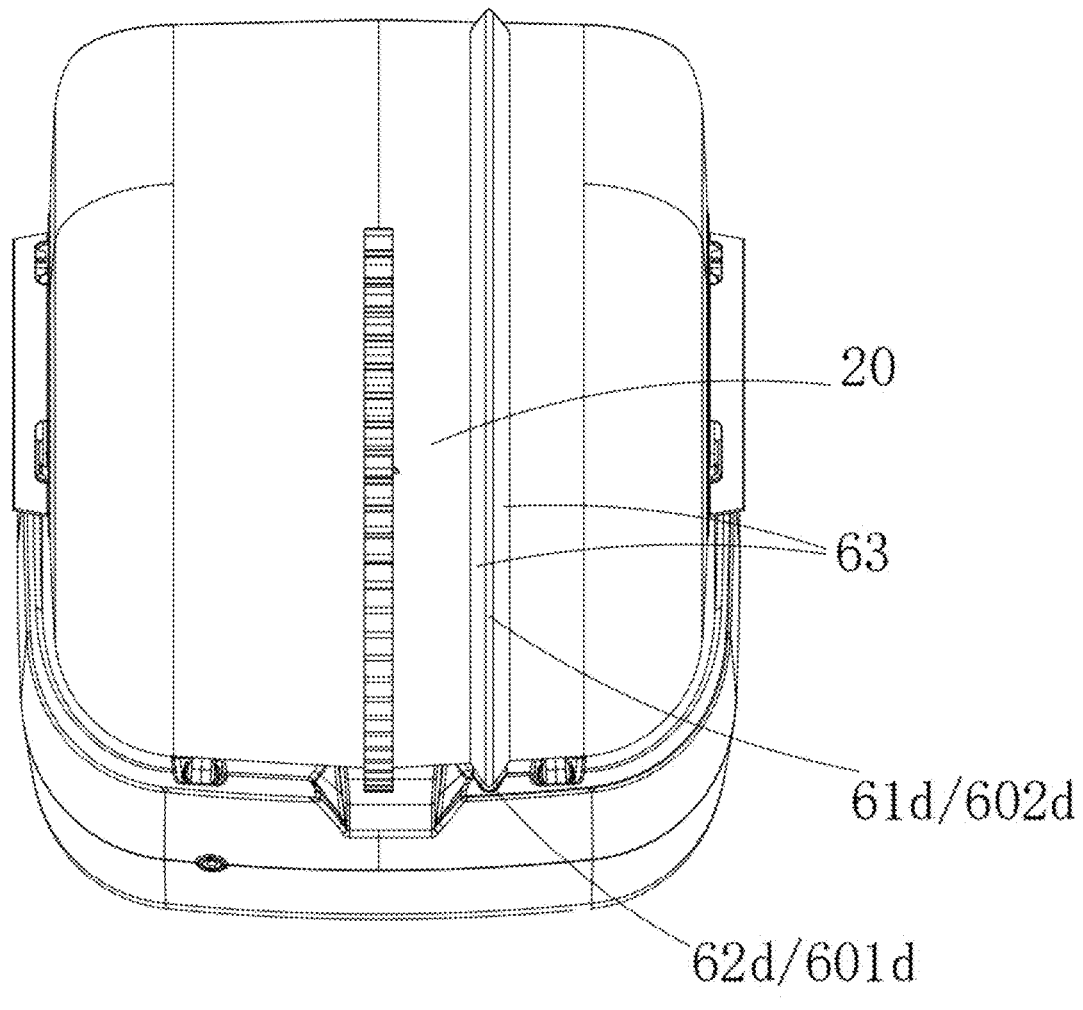
FIG. 14 is a schematic view of the self-cleaning cat litter box in a case where each of a cross-section of a guiding boss and a cross-section of a guiding groove is wedge-shaped according to an embodiment of the present disclosure.

In the above two embodiments, the number of the guiding groove 601*b* or 601*c* is the same as the number of the guiding boss 602*b* or 602*c*. In another embodiment, as shown in FIG. 14, the first guiding part 61*d* is a guiding boss 602*d*, and the second guiding part 62*d* is a guiding groove 601*d*. Cross-sections of the guiding groove 601*d* and the guiding boss 602*d* can be V-shaped or wedge-shaped. As illustrated in FIG. 14, each of two inner ramps of the guiding groove 601*d* and two outer ramps of the guiding boss 602*d* can be used as the guiding ramp 63.

Figure 15:
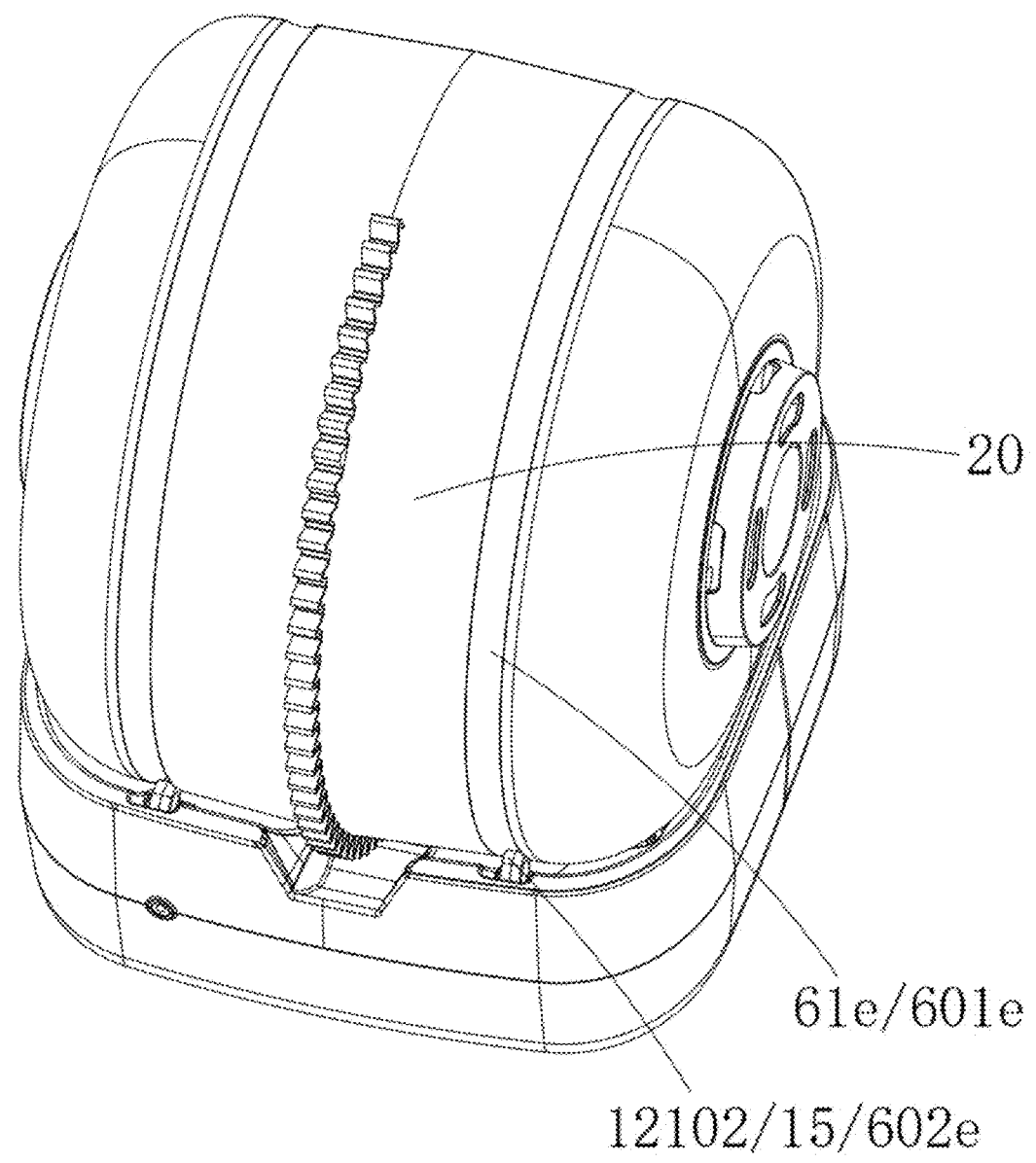
FIG. 15 is a structural view of the guiding structure according to another embodiment of the present disclosure.

In a further embodiment, as shown in FIG. 15, a guiding wheel 15 is rotatably arranged on the base 1, and the guiding wheel 15 can abut against the outer peripheral wall 20 of the drum 2. The first guiding part 61*e* is a guiding groove 601*e* which is defined in the outer peripheral wall 20 of the drum 2. The second guiding part 62*e* is arranged on the guiding wheel 15.

Figure 16:
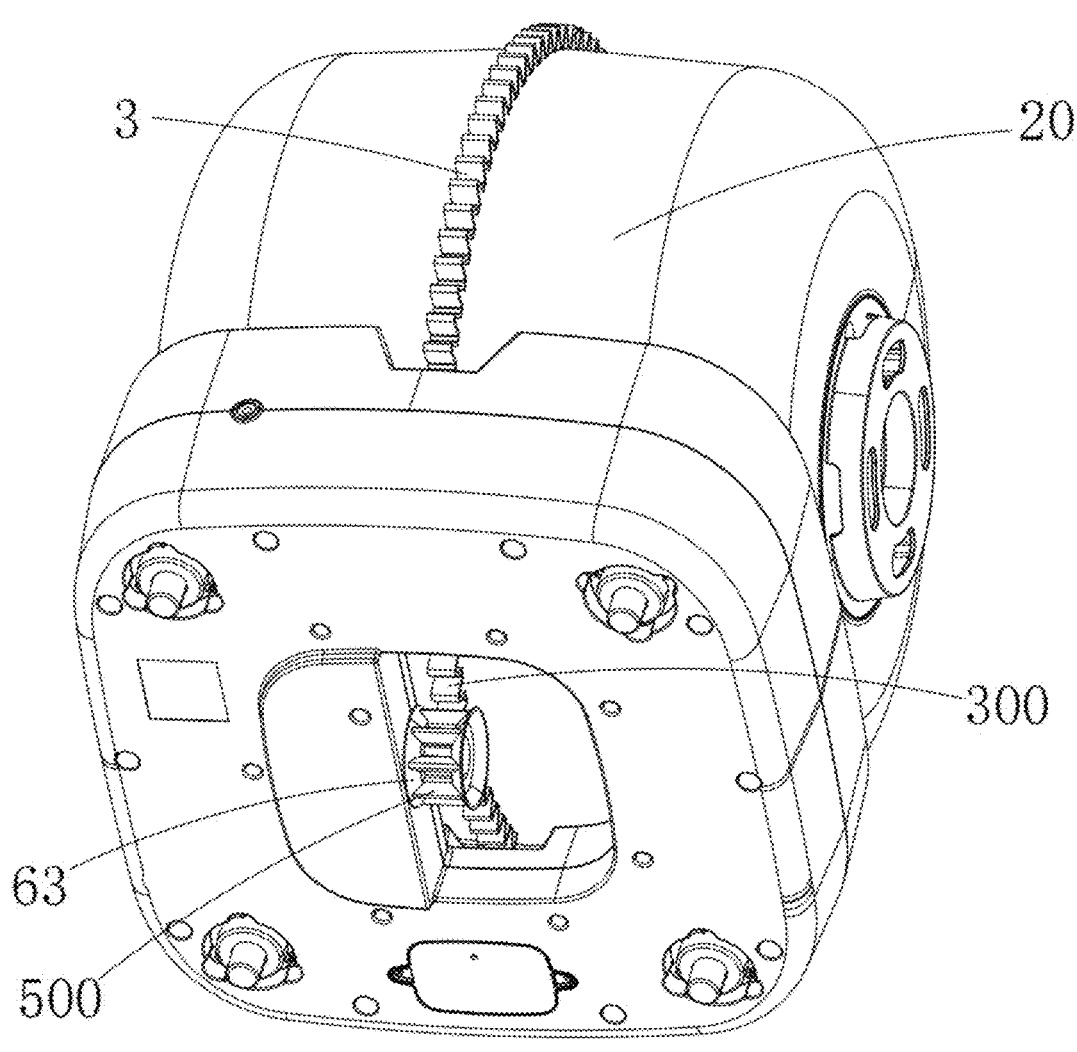
FIG. 16 is a structural view of the guiding structure according to yet another embodiment of the present disclosure.

In an yet another embodiment, the number of the at least one driving toothed structure 5 is one, and the number of the at least one driven toothed structure 3 is also one. As shown in FIG. 16, the teeth 300 of the driven toothed structure 3 can engage with the teeth 500 of the driving toothed structure 5.

Figure 2:
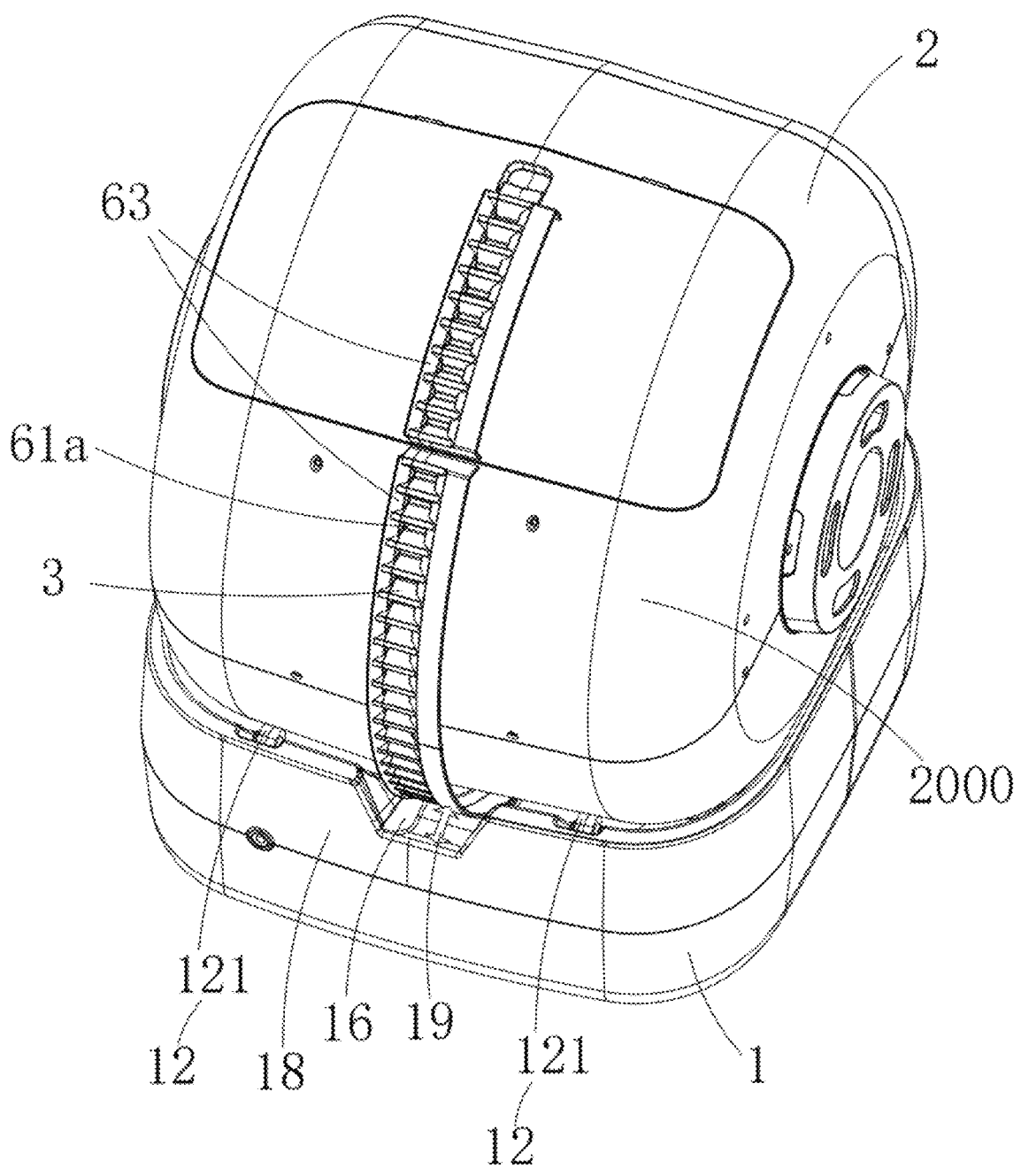
FIG. 2 is a second schematic view of the overall structure of the self-cleaning cat litter box according to an embodiment of the present disclosure.
Figure 3:
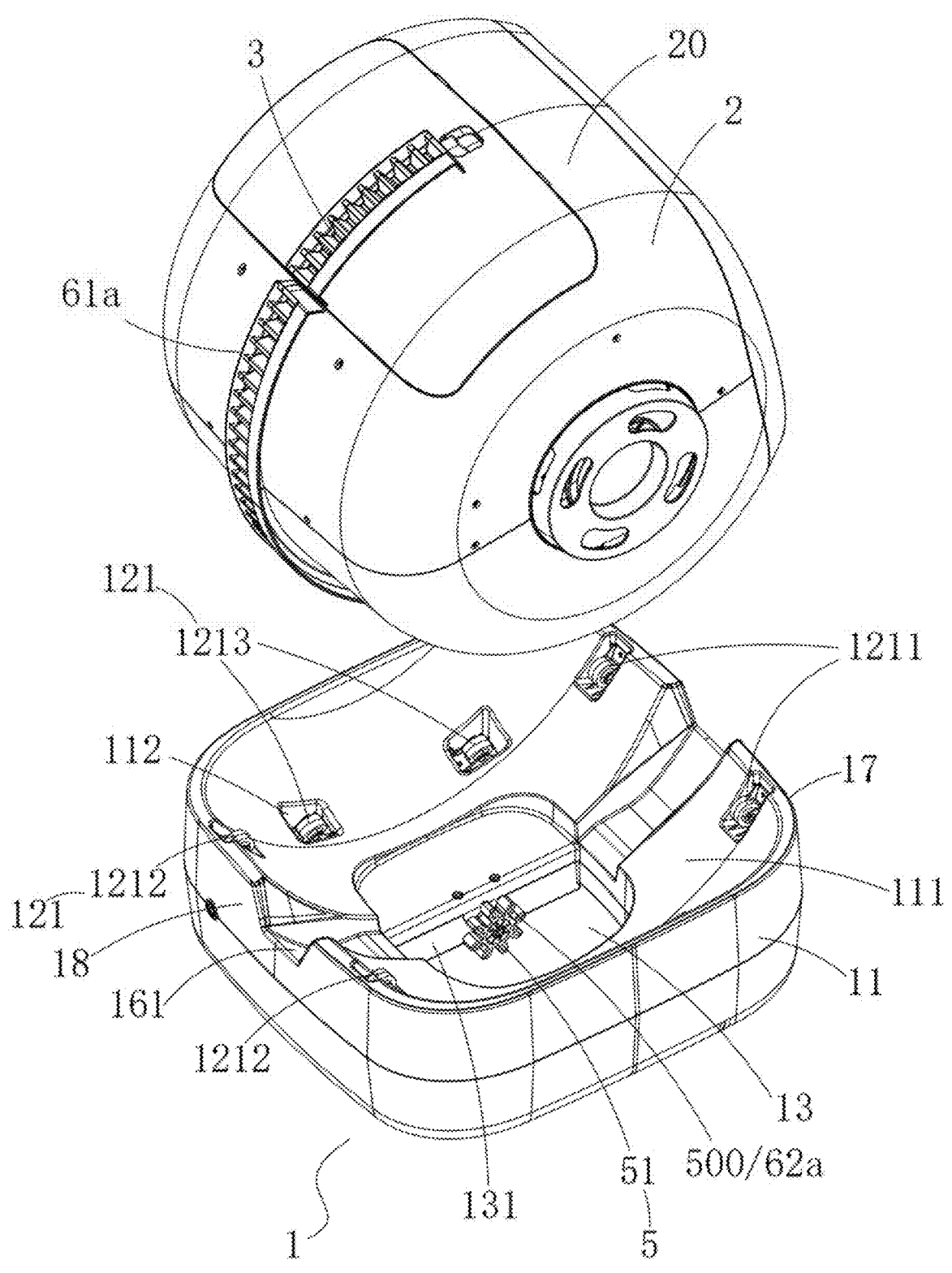
FIG. 3 is an exploded view of a drum and a base according to an embodiment of the present disclosure.

In an embodiment, the number of the at least one driving toothed structure 5 is one, and the number of the at least one driven toothed structure 3 is also one. As shown in FIGS. 2, 3 and 5, the first guiding part 61*a* is a guiding groove 601*a* defined in the outer peripheral wall 20 of the drum 2. The guiding groove 601*a* extends along the circumferential direction of the drum 2. The driven toothed structure 3 is disposed in the guiding groove 601*a*. The second guiding part 62*a* is arranged on the driving toothed structure 5. The teeth 500 of the driving toothed structure 5 can insert into the guiding groove 601*a* to engage with the driven toothed structure 3. In this embodiment, the guiding structure 6 is associated with the driving structure 5, allowing the surface of the drum 2 more concise.

Specifically, in the present embodiment, in order to reduce difficulty in opening mold of the drum 2, the driven toothed structure 3 is protrudingly arranged on the surface of the drum 2 without a grooving operation to the surface of the drum 2. On this basis, in order to form the guiding groove 601*a*, as shown in FIGS. 5 and 6, at least two limiting baffles 22 are arranged on the outer peripheral wall 20 of the drum 2, and the guiding groove 601*a* is formed by enclosing the at least two limiting baffles 22, and at least one limiting baffle 22 is arranged with the guiding ramp 63. In an example, the guiding groove 601*a* is formed by enclosing two limiting baffles 22 together, each of the two limiting baffles 22 are arranged with the guiding ramp 63 on a side away from the outer peripheral wall 20 of the drum 2, and the driven toothed structure 3 is arranged between the two limiting baffles 22. When the drum 2 has an axial deviation, the driving toothed structure 5 may abut against one of the two limiting baffles 22, thereby preventing the drum 2 from a further deviation.

It should be noted that, in the present embodiment, the number of the guiding groove 601*a* corresponds to the number of the driven gear 31. Each driven gear 31 is disposed in a corresponding guiding groove 601*a*, and each guiding groove 601*a* is correspondingly defined by two limiting baffles 22.

Taking into account the difficulty in opening mold of the drum 2, in this embodiment, at least one of the two limiting baffles 22 is detachably connected to the drum 2. For example, the two limiting baffles 22 include a first baffle 221 and a second baffle 222. The first baffle 221 is connected to the drum 2 by screws, and the second baffle 222 is configured as a one-piece structure with the drum 2. In other words, at a molding stage, the first baffle 221 is separately opened mold. After the first baffle 221 and the drum 2 are molded, the first baffle 221 is then fixed to the drum 2 by screws.

As the self-cleaning cat litter box of the present disclosure is configured without a locking structure for the drum 2, the drum 2 can be removed at will. In order to prevent the user from placing the drum 2 on the base 1 in reverse, in the present embodiment, an inner cavity 13 is defined in the base 1. The base 1 has an inner wall 131 corresponding to the inner cavity 13. The driving toothed structure 5 is disposed in the inner cavity 13. A limiting gap 14 is defined between the driving toothed structure 5 and the inner wall 131. The two limiting baffles 22 include the first baffle 221 and the second baffle 222. The first baffle 221 can insert into the limiting gap 14. The second baffle 222 is arranged with a foolproof flange 223. The foolproof flange 223 extends in a direction away from the first baffle 221. An extension length of the foolproof flange 223 is greater than a width of the limiting gap 14. In this way, the foolproof flange 223 cannot insert into the limiting gap 14, thereby limiting a placement direction of the drum 2.

Furthermore, in order to improve rotation stability of the drum 2 and prevent the drum 2 from toppling over, the plurality of roller assemblies 121 include at least a first roller assembly 1211 and a second roller assembly 1212. The first roller assembly 1211 has a first contact point 201 contacting the drum 2, and the second roller assembly 1212 has a second contact point 202 contacting the drum 2. A height of the first contact point 201 and a height of the second contact point 202 are the same or approximately the same, and a height difference between the height of the first contact point 201 and the height of the second contact point 202 is within 3 cm.

Figure 7:
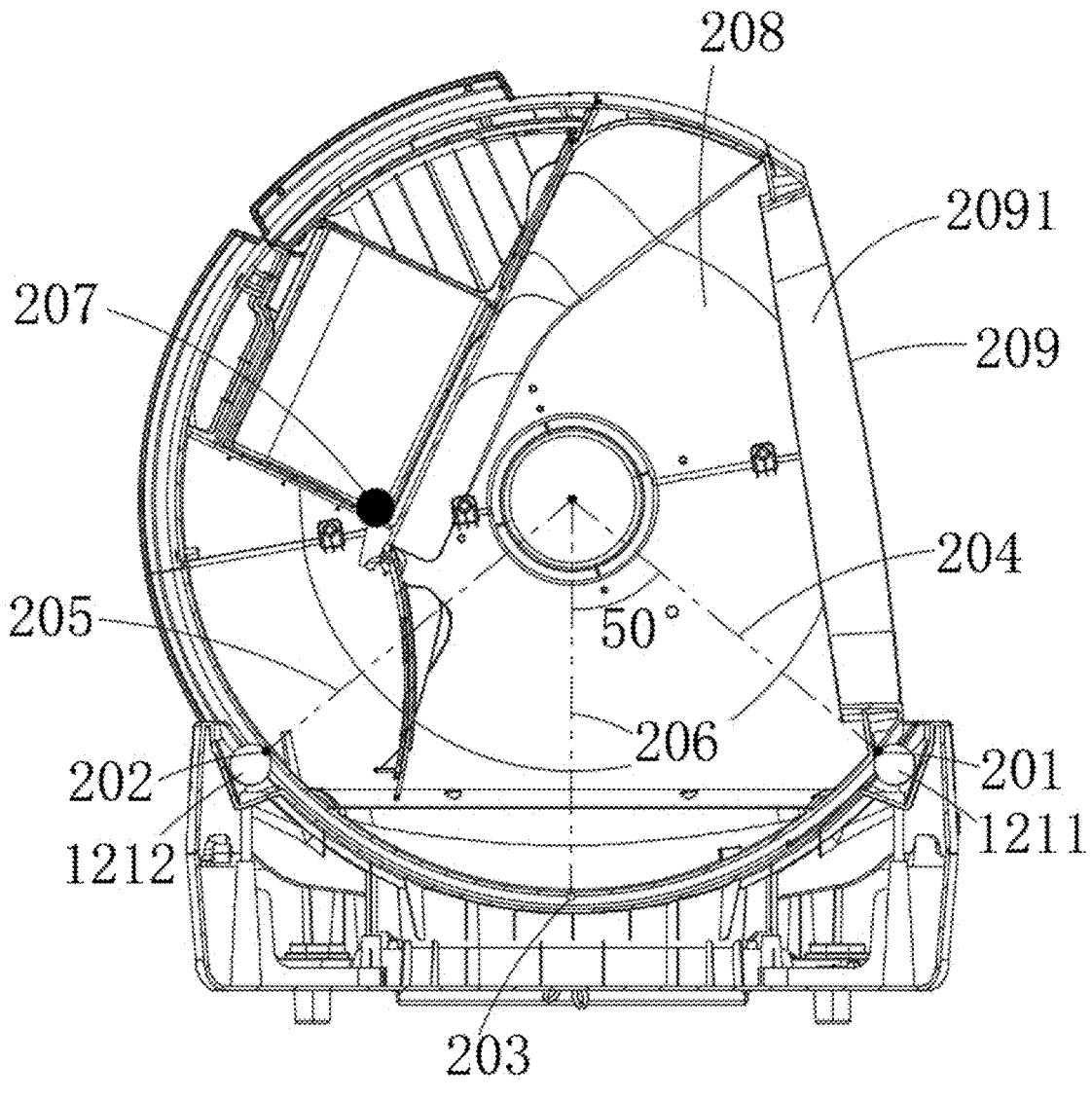
FIG. 7 is a first longitudinal-sectional view of the self-cleaning cat litter box according to an embodiment of the present disclosure, illustrating an angle relationship among a first connection line, a second connection line, and a reference line.
Figure 8:
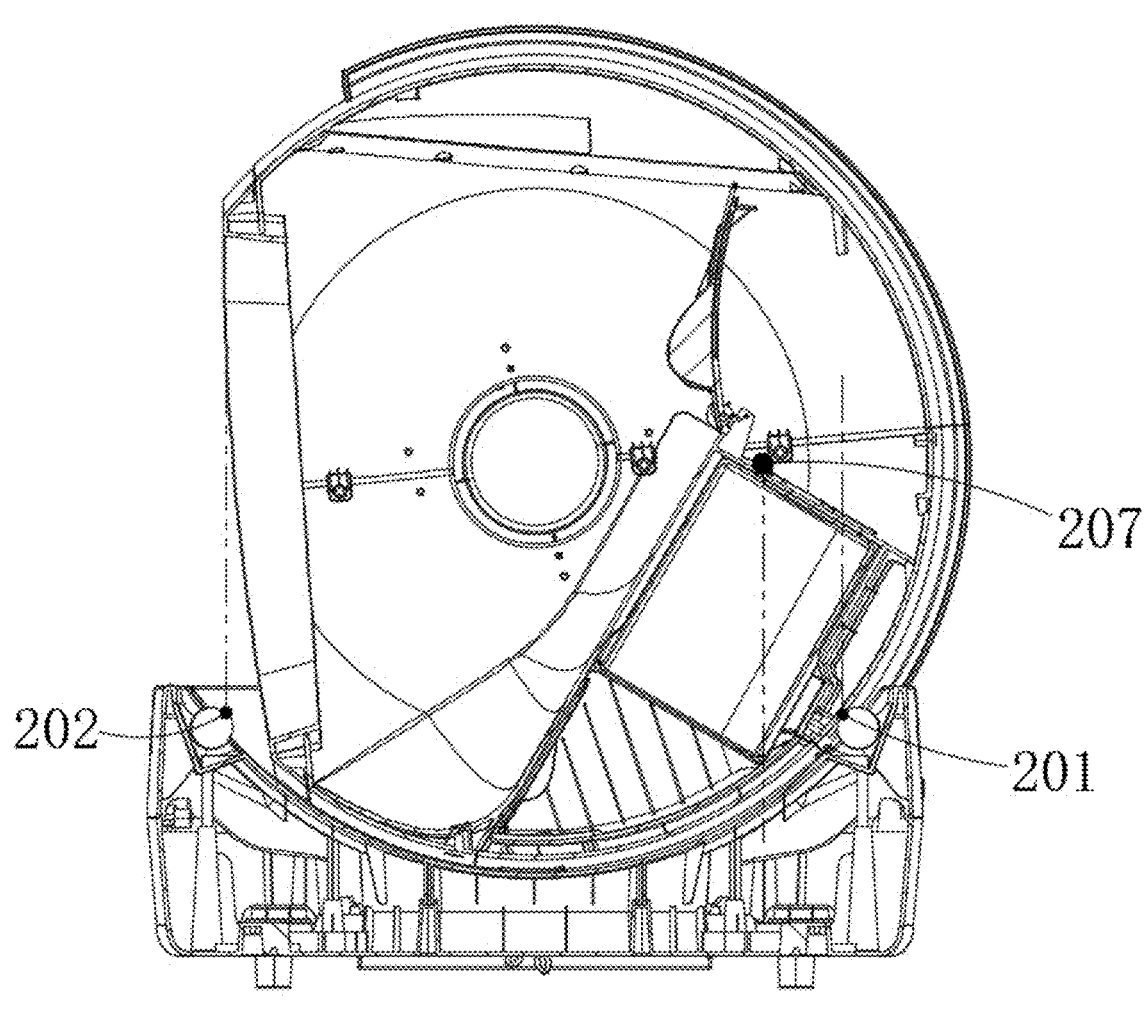
FIG. 8 is a second longitudinal-sectional view of the self-cleaning cat litter box according to an embodiment of the present disclosure, illustrating a position relationship among a first contact point, a second contact point, and a center of gravity of the drum.

As shown in FIGS. 7 and 8, in an embodiment, differences in the internal structure of drum 2 may lead to different positions of the center of gravity 207 of drum 2. Therefore, positions of the first roller assembly 1211 and the second roller assembly 1212 need only be designed to ensure that the center of gravity 207 of the drum 2 is maintained between the first contact point 201 and the second contact point 202, thereby preventing the drum 2 from toppling over.

In another embodiment, the drum 2 has a lowest point 203 at a lowest part of the outer peripheral wall 20. A first connection line 204 is defined as a connection line from the first contact point 201 to the rotation axis 2000 of the drum 2. A second connection line 205 is defined as a connection line from the second contact point 202 to the rotation axis 2000 of the drum 2. A reference line 206 is defined as a connection line from the lowest point 203 of the drum 2 to the rotation axis 2000 of the drum 2. An angle between the first connection line 204 and the reference line 206 is approximately between 35° and 60°, and an angle between the second connection line 205 and the reference line 206 is also approximately between 35° and 60°. In an example, each of the above two angles is 50°. The aforementioned ranges of the two angles can accommodate designs of the center of gravity 207 of a vast majority of drums 2, and a change range of the center of gravity 207 of the drum 2 can be maintained between the first contact point 201 and the second contact point 202.

In addition, in order to enable the supporting mechanism 12 to support the drum 2 more stably, the plurality of roller assemblies 121 may further include at least two auxiliary roller assemblies 1213. The at least two auxiliary roller assemblies 1213 are distributed between the first roller assembly 1211 and the second roller assembly 1212. Particularly, the number of the at least two auxiliary roller assemblies 1213 is two.

Furthermore, each roller assembly 121 includes two roller structures 1210 approximately symmetrically arranged with respect to the central plane 200, or may also include four, six, or even more roller structures 1210. All the roller structures 1210 of each roller assembly 121 are at a same height level.

Figure 10:
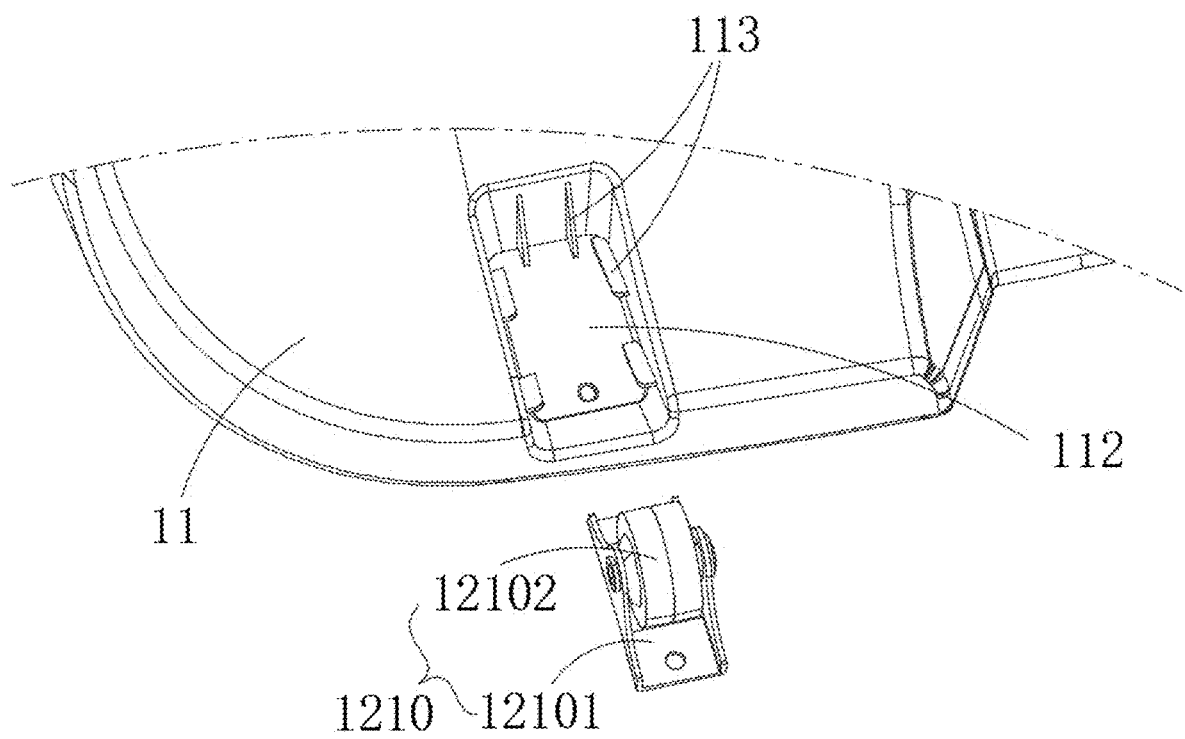
FIG. 10 is a schematic view of mounting of a roller structure and a mounting groove according to an embodiment of the present disclosure.

Furthermore, regarding a specific arrangement of the roller structure 1210, in an embodiment, as shown in FIG. 10, the roller structure 1210 includes a connecting seat 12101 and an abutting wheel 12102. The connecting seat 12101 is fixedly mounted on the bottom shell 11 by screws, and the abutting wheel 12102 is rotatably arranged on the connecting seat 12101. The abutting wheel 12102 is configured to abut against the outer peripheral wall 20 of the drum 2. By means of the connecting seat 12101, the abutting wheel 12102 can be connected to an outer surface of the bottom shell 11, reducing difficulty in mounting and production of the abutting wheel 12102. In addition, the abutting wheel 12102 can be concurrently used as the guiding wheel 15 in another aforementioned embodiment.

Figure 9:
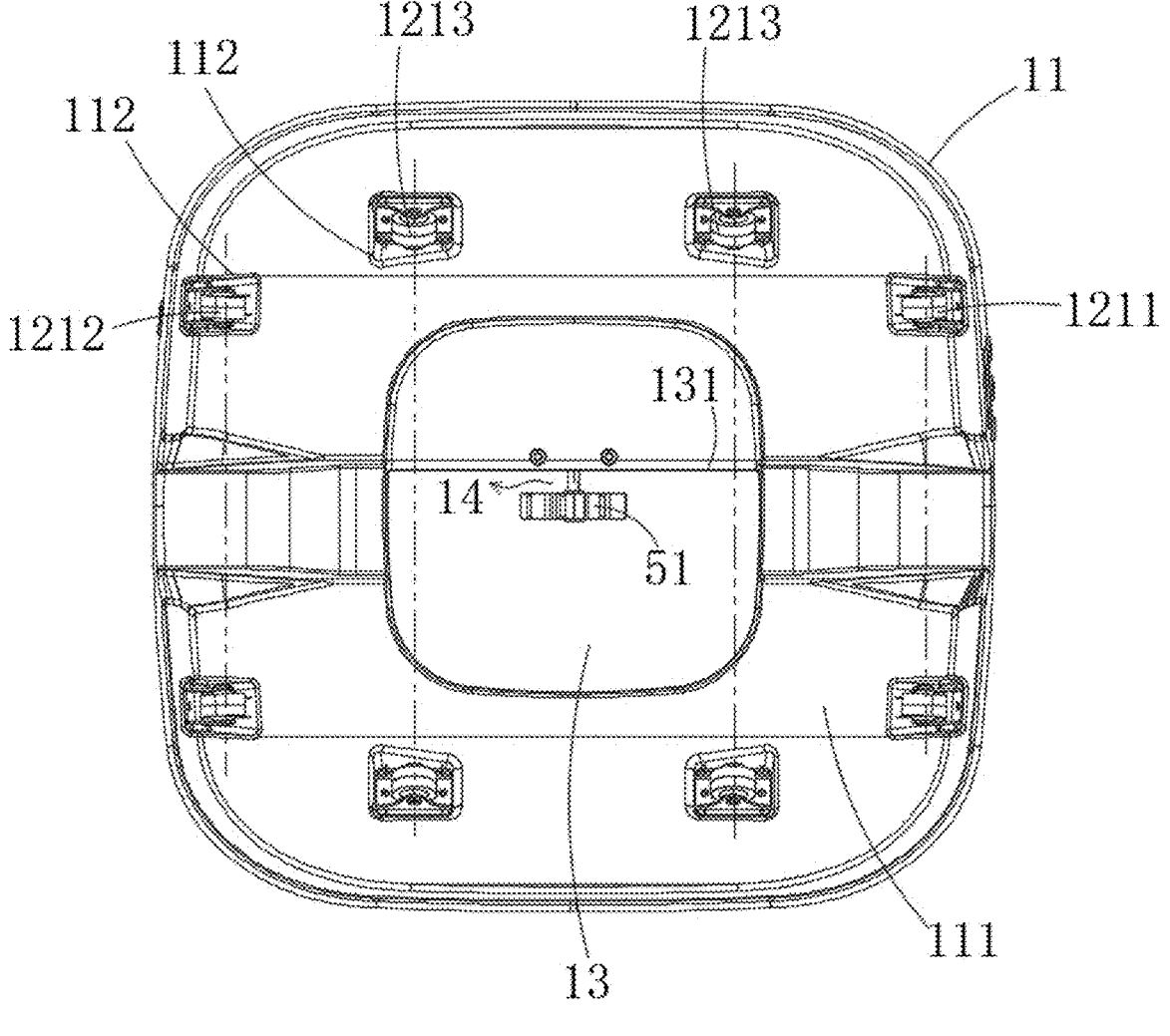
FIG. 9 is a structural view of the base according to an embodiment of the present disclosure.

Furthermore, for aesthetic reasons of the self-cleaning cat litter box, as shown in FIGS. 4 and 9, a rotation groove 111 is also defined in the bottom shell 11. The plurality of roller assemblies 121 are all mounted in the rotation groove 111, and a bottom of the drum 2 can insert into the rotation groove 111 to abut against the roller assemblies 121. In other words, a lower side of the drum 2 can be accommodated in the bottom shell 11. In addition, a shape of the inner wall corresponding to the rotation groove 111 matches a shape of the outer peripheral wall 20 of the drum 2, and the rotation groove 111 is slightly larger than the drum 2 in size.

It should be noted that, in order to prevent the driving mechanism from getting human tissues such as hair and fingers involved and causing injury to the user, in an embodiment, the base 1 includes a front wall 17 and a rear wall 18. A wall corresponding to a side where a cat enters the drum 2 is defined as the front wall 17. The driving gear 51 is arranged in a middle of the base 1. An avoidance groove 16 is defined in the base 1 corresponding to each driven gear 31. The avoidance groove 16 communicates with the front wall 17 and the rear wall 18. The driven gear 31 can insert into a corresponding avoidance groove 16. The avoidance groove 16 communicates with the rotation groove 111. An avoidance gap 19 is defined between a bottom wall 161 corresponding to the avoidance groove 16 and a corresponding driven gear 31. The avoidance gap 19 is relatively wide and deep, allowing fingers to stretch in and be withdrawn calmly. The avoidance gap 19 is as shown in FIG. 2. A maximum depth of the avoidance gap 19 is 1.2 times or more of a tooth height of the driven gear 31.

In order to contract a gap between the drum 2 and the bottom shell 11 and prevent the cat from getting into this gap, in an embodiment, as shown in FIGS. 9 and 10, a mounting groove 112 communicating with the rotation groove 111 is also defined in the bottom shell 11. The connecting seat 12101 is fixed in the mounting groove 112, and the roller structure 1210 is integrally mounted on the bottom shell 11 in an inlaid manner. Furthermore, a plurality of limiting reinforcing ribs 113 are arranged along a circumferential side of the connecting seat 12101 in the mounting groove 112. The limiting reinforcing ribs 113 are configured to abut against the connecting seat 12101. During mounting the connecting seat 12101, the limiting reinforcing ribs 113 are mainly used to facilitate quick positioning.

Figure 17:
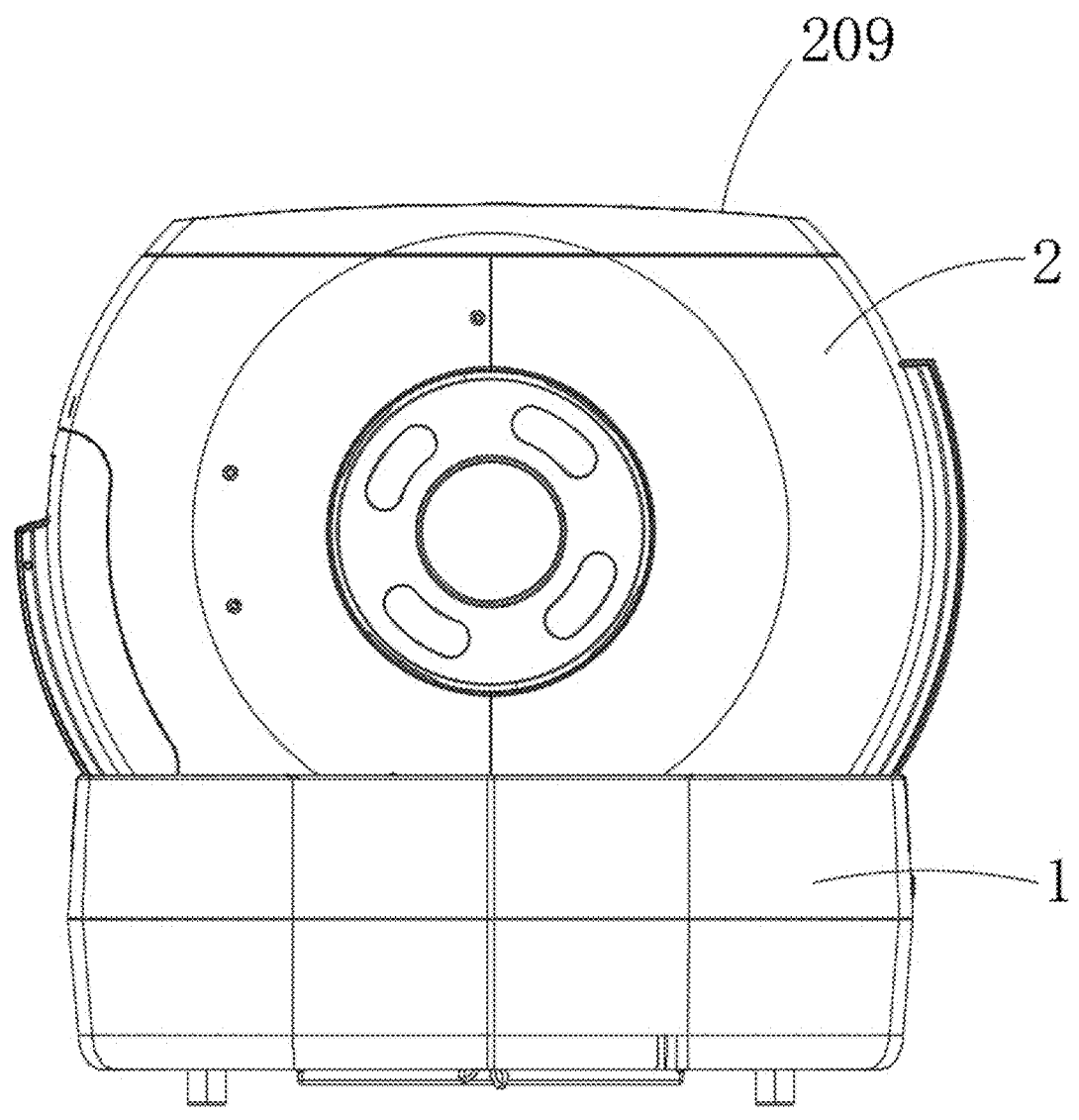
FIG. 17 is a schematic view of the self-cleaning cat litter box with an entry face facing directly upward according to an embodiment of the present disclosure.

Furthermore, referring to FIG. 7, a working cavity 208 is defined in the drum 2. A side of the drum 2 has a flat or approximately flat entry face 209. An entrance 2091 communicating with the working cavity 208 is opened in the entry surface 209. The entry surface 209 may face upwards by rotating the drum 2. As shown in FIG. 17, the entry surface 209 faces directly upwards, thus greatly reducing an overall height of the self-cleaning cat litter box, which is convenient for packaging and transportation and saves freight.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A self-cleaning cat litter box, comprising:
   a base;
   a drum, approximately symmetrically arranged with respect to a central plane perpendicular to a rotation axis of the drum;
   at least one driven toothed structure, arranged on an outer peripheral wall of the drum, extending along a circumferential direction of the drum, and approximately symmetrically arranged with respect to the central plane;
   at least one driving toothed structure, mounted on the base, wherein each of the at least one driving toothed structure is configured to engage with a respective one of the at least one driven toothed structure;
   a driving device, configured to drive the at least one driving toothed structure to rotate;
   wherein when the drum is disposed on the base, each of the at least one driven toothed structure engages with a respective one of the at least one driving toothed structure, and the driving device is capable of driving the at least one driving toothed structure and driving the drum to rotate about the rotation axis;
   wherein the self-cleaning cat litter box further comprises a guiding structure, the guiding structure comprises a guiding groove defined in an outer surface of the drum; the guiding groove has two inclined groove inner walls; the at least one driven toothed structure is located in the guiding groove; the two inclined groove inner walls are configured to guide engagement between the at least one driving toothed structure and the at least one driven toothed structure; and
   wherein the at least one driven toothed structure is protrudingly arranged on the outer peripheral wall of the drum, at least two limiting baffles are arranged on the outer peripheral wall of the drum, and the at least two limiting baffles enclose to form the guiding groove; and at least one of the at least two limiting baffles is detachably connected to the drum;
   wherein an inner cavity is defined in the base, the base comprises an inner wall corresponding to the inner cavity, the at least one driving toothed structure is disposed in the inner cavity, and a limiting gap is defined between the at least one driving toothed structure and the inner wall; and the at least two limiting baffles comprise a first baffle and a second baffle, the first baffle is capable of inserting into the limiting gap, the second baffle is arranged with a flange, the flange extends in a direction away from the first baffle, and an extension length of the flange is greater than a width of the limiting gap.

2. The self-cleaning cat litter box as claimed in claim 1, when the drum is disposed on the base, guidance of the two inclined groove inner walls is configured to constrain the drum from displacing along the rotation axis.

3. The self-cleaning cat litter box as claimed in claim 1, wherein the two inclined groove inner walls face opposite to each other.

4. The self-cleaning cat litter box as claimed in claim 1, wherein:

a guiding wheel is rotatably arranged on the base, a second guiding groove is defined in the outer peripheral wall of the drum, and guiding bosses are arranged on the guiding wheel;

when the drum is disposed on the base, the guiding wheel is inserted in the second guiding groove and abuts against the outer peripheral wall of the drum.

5. The self-cleaning cat litter box as claimed in claim 1, wherein the number of the at least one driven toothed structure is one, the one driven toothed structure is configured as a driven gear, and the driven gear is arranged in a middle of the outer peripheral wall of the drum.

6. The self-cleaning cat litter box as claimed in claim 1, wherein the number of the at least one driven toothed structure is two, each of the two driven toothed structures is configured as a driven gear, the two driven gears are approximately symmetrically arranged with respect to the central plane and are arranged on the outer peripheral wall of the drum, and the number of the at least one driving toothed structure is two, and the two driving toothed structures are configured to simultaneously engage with the two driven gears respectively.

7. The self-cleaning cat litter box as claimed in claim 1, wherein the number of the at least one driven toothed structure is more than one, each of the more than one driven toothed structures is configured as a driven gear, the number of the at least one driving toothed structure is more than one, each of the more than one driving toothed structures is configured as a driving gear, and the driving gear is configured to engage with the driven gear; the number of the at least one driving toothed structure is equal to the number of the at least one driven toothed structure, and the each of the more than one driven gears is arranged on the outer peripheral wall of the drum.

8. The self-cleaning cat litter box as claimed in claim 1, wherein:

the number of the at least one driven toothed structure is more than one, each of the more than one driven toothed structures is configured as a driven gear, the each of the more than one driven gears is arranged on the outer peripheral wall of the drum, and the more than one driven gears form a symmetrical structure approximately symmetrically arranged with respect to the central plane;

the base has a front wall and a rear wall, an avoidance groove is defined in the base corresponding to the each of the more than one driven gears, and the avoidance groove extends to penetrate the front wall and the rear wall; and when the drum is disposed on the base, the each of the more than one driven gears is received in the avoidance groove, and an avoidance gap is defined between a bottom wall corresponding to the avoidance groove and a corresponding one of the more than one driven gears.

9. The self-cleaning cat litter box as claimed in claim 1, wherein a protruding edge of each tooth of the at least one driven toothed structure is recessed with respect to an outer periphery of the two inclined groove inner walls.

10. A self-cleaning cat litter box, comprising:

a base;

a drum, approximately symmetrically arranged with respect to a first central plane perpendicular to a rotation axis of the drum;

at least one driven toothed structure, arranged on an outer peripheral wall of the drum, extending along a circumferential direction of the drum, and approximately symmetrically arranged with respect to the first central plane;

at least one driving toothed structure, mounted on the base, wherein each of the at least one driving toothed structure is configured to engage with a respective one of the at least one driven toothed structure;

a driving device, configured to drive the at least one driving toothed structure to rotate;

wherein when the drum is disposed on the base, each of the at least one driven toothed structure engages with a respective one of the at least one driving toothed structure, and the driving device is capable of driving the at least one driving toothed structure and driving the drum to rotate about the rotation axis;

wherein the base comprises a bottom shell and a supporting mechanism, the supporting mechanism is mounted on the bottom shell and configured to support the drum, the supporting mechanism comprises a plurality of roller assemblies, and each of the plurality of roller assemblies is mounted on the bottom shell;

when the drum is disposed on the base, the plurality of roller assemblies are located below the drum and arranged along the circumferential direction of the drum, and the each of the plurality of roller assemblies abuts against the outer peripheral wall of the drum;

wherein the plurality of roller assemblies comprise a first roller assembly and a second roller assembly;

when the drum is disposed on the base, the first roller assembly has a first contact point contacting the drum, and the second roller assembly has a second contact point contacting the drum; and during a rotation of the drum, a center of gravity of the drum is variable and is always maintained between the first contact point and the second contact point;

wherein the self-cleaning cat litter box further comprises a guiding structure, the guiding structure comprises a guiding groove defined in an outer surface of the drum; the guiding groove has two inclined groove inner walls; the at least one driven toothed structure is located in the guiding groove; the two inclined groove inner walls are configured to guide engagement between the at least one driving toothed structure and the at least one driven toothed structure; and wherein the at least one driven toothed structure is protrudingly arranged on the outer peripheral wall of the drum, at least two limiting baffles are arranged on the outer peripheral wall of the drum, and the at least two limiting baffles enclose to form the guiding groove; and at least one of the at least two limiting baffles is detachably connected to the drum;

wherein an inner cavity is defined in the base, the base comprises an inner wall corresponding to the inner cavity, the at least one driving toothed structure is disposed in the inner cavity, and a limiting gap is defined between the at least one driving toothed structure and the inner wall; and the at least two limiting baffles comprise a first baffle and a second baffle, the first baffle is capable of inserting into the limiting gap, the second baffle is arranged with a flange, the flange extends in a direction away from the first baffle, and an extension length of the flange is greater than a width of the limiting gap.

11. The self-cleaning cat litter box as claimed in claim 10, wherein:

the drum has a lowest point at a lowest part of the outer peripheral wall;

a first connection line is defined as a connection line from the first contact point to the rotation axis of the drum, a reference line is defined as a connection line from the lowest point to the rotation axis of the drum, and an angle between the first connection line and the reference line is approximately between 35° and 60°; and a second connection line is defined as a connection line from the second contact point to the rotation axis of the drum, and an angle between the second connection line and the reference line is approximately between 35° and 60°.

12. The self-cleaning cat litter box as claimed in claim 10, wherein each of the first roller assembly and the second roller assembly comprises at least two roller structures which are approximately symmetrically arranged with respect to the first central plane; the drum further has a second central plane substantially perpendicular to the first central plane; and the first roller assembly and the second roller assembly are substantially symmetrically arranged with respect to the second central plane.

13. The self-cleaning cat litter box as claimed in claim 10, wherein:

a rotation groove is defined in the bottom shell, each of the plurality of roller assemblies is mounted in the rotation groove;

when the drum is disposed on the base, a bottom of the drum is received in the rotation groove and abuts against the plurality of roller assemblies; and a shape of an inner wall corresponding to the rotation groove matches a shape of the outer peripheral wall of the drum.

\* \* \* \* \*